UNITED STATES PATENT OFFICE.

GIOVANNI LIZIERI, OF NEWCASTLE-UPON-TYNE, ENGLAND, ASSIGNOR TO THE FLORENTINE FLOORING COMPANY LIMITED, OF NEWCASTLE-UPON-TYNE, ENGLAND.

COMPOSITION FOR COVERING FLOORS, WALLS, AND OTHER SURFACES.

1,141,897.   Specification of Letters Patent.   Patented June 1, 1915.

No Drawing.   Application filed January 16, 1914.   Serial No. 812,572.

*To all whom it may concern:*

Be it known that I, GIOVANNI LIZIERI, a subject of the King of Italy, residing at Newcastle-upon-Tyne, in the county of Northumberland, in England, have invented a certain new and useful Improved Composition for Covering Floors, Walls, and other Surfaces, of which the following is a specification.

This invention relates to an improved composition suitable for covering floors, walls, roofs or for lining reservoirs, cisterns, baths and the like.

The composition consists of:—(a) The cement known in trade as Florentine cement, which is a magnesite sulfurous hard stone of volcanic nature found in Tuscany, which is burned and finely powdered. (b) Finely sifted sawdust, finely ground cork dust, asbestos, and pumice stone, all in more or less equal proportions depending on the fineness or coarseness of the composition required. If very fine quality is required, one portion of ground paper is added to the above. (c) Soft soap dissolved in water in the proportion of about ¾ lb. to one gallon of water. The powdered materials must be very dry and well mixed together in the proportion of one of (a) to three of (b) by measure. The soapy water is added to the dry mixture in the proportion of one of water to two of mixture by measure, and well stirred. Chemical action takes place between the alkali and the magnesite of the powdered materials. This causes all the ingredients to bind together, and form a plastic mass, which when dry is hard, and both fireproof and waterproof, and can be sawed or planed. The composition is applied to the floor or other surface in a plastic state, and adheres firmly to such surface whether it be wood, stone, concrete, metals, or the like, and when dry does not expand or contract, and is not affected by changes of temperature. It can also be formed into thin slabs or the like, and used for roofing and other purposes.

The composition can be made of any color by adding dry earth colors to the dry mixture, or by mixing coloring matter with the soapy water; and can be inlaid to represent marble, mosaic, granite, and the like.

What I claim as my invention and desire to secure by Letters Patent of the United States is:—

1. A composition for covering floors, walls, and other surfaces comprising one part of Florentine cement, three parts of a mixture comprising essentially substantially equal parts of sawdust, ground cork, asbestos and pumice stone, and a solution of soft soap in water in the proportion of three quarters of a pound of soap to a gallon of water, the said solution being added in the proportion of one part to two parts by measure of the aforesaid materials.

2. A composition for covering floors, walls, and other surfaces consisting of one part of Florentine cement, three parts of a mixture consisting of substantially equal parts of sawdust, ground cork, asbestos, pumice stone and ground paper, and a solution of soft soap in water in the proportion of three quarters of a pound of soap to a gallon of water, the said solution being added in the proportion of one part to two parts by measure of the aforesaid materials.

3. A composition for covering floors, walls, and other surfaces comprising Florentine cement, a mixture of sawdust, cork, asbestos, and pumice stone, and a solution comprising essentially soft soap in water in the proportions substantially as described.

In witness whereof I have signed this specification in the presence of two witnesses.

GIOVANNI LIZIERI.

Witnesses:
 JOHN HARDINGE VEITCH,
 CHARLES STEPHEN GARDNER.